Patented Nov. 10, 1942

2,301,867

UNITED STATES PATENT OFFICE 2,301,867

POLYVINYL HALIDE COMPOSITIONS

Thomas L. Gresham, Akron, Ohio, assignor to The B. F. Goodrich Company, New York, N. Y., a corporation of New York No Drawing. Application May 25, 1940, Serial No. 337,250

9 Claims. (Cl. 260—36)

This invention relates to polyvinyl halide compositions, and has as its principal object to provide plasticizers for polyvinyl halides which impart desirable properties to compositions in which they are employed.

Plasticized polyvinyl halides have found many useful applications because of their extraordinary resistance to oxidation, organic solvents, acids, alkalies, oils, and other deteriorating influence. It has been observed, however, that they discolor and lose their normal transparency during heat molding operations or long exposure to light. This change in the appearance of plasticized polyvinyl halides limits their usefulness as films, coating materials, and molded articles where appearance is a factor.

Loss of transparency and discoloration have ordinarily been observed when the lower dialkyl phthalates such as dibutyl phthalate have been employed, and also when the lower dialkyl hydrogenated phthalates such as dibutyl hexahydro phthalate have been employed. It has now been discovered that the liquid esters of 4-cyclohexene-1,2-dicarboxylic acid (tetrahydrophthalic acid) form polyvinyl halide compositions with a greatly decreased tendency to discolor and lose transparency under the influence of heat and light.

Any liquid esters such as the diethyl, di-n-butyl, di-isoamyl, di-2-ethylbutyl, di-2-ethylhexyl, dicyclohexyl, phenyl methyl, dibenzyl, ditetrahydrofurfuryl, di-2-methoxyethyl, di-2-n-propoxyethyl, and di-ethoxymethyl esters of 4-cyclohexene-1,2-dicarboxylic acid may be employed, the dialkyl esters being preferred. By liquid esters are meant those compounds which exist as liquids below about 30° C. In some cases it is possible to form liquid esters within the scope of this invention by mixing two solid esters or one solid and one liquid ester to form a two-component system having a freezing point below 30° C.

The plasticizers of this invention may be employed with any type of polyvinyl halide such as alpha, beta, or gamma polyvinyl chloride, polyvinyl bromide, or polyvinyl halide compositions formed by the conjoint polymerization of a vinyl halide such as vinyl chloride with a minor proportion of another polymerizable material which may be a vinyl ester of an aliphatic acid such as vinyl acetate or an alkyl ester of an acrylic acid such as methyl methacrylate or other polymerizable compounds such as vinyl cyanide or vinylidene chloride. The plasticizers of this invention are particularly useful in the gamma polyvinyl chloride compositions described in U. S. Patent No. 1,929,453 issued to Waldo L. Semon.

Esters of 4-cyclohexene-1,2-dicarboxylic acid are readily prepared by esterifying 4-cyclohexene-1,2-dicarboxylic anhydride with the desired alcohol. The anhydride may be prepared by the condensation of butadiene-1,3 and maleic anhydride.

The plasticizers of this invention may be incorporated in polyvinyl halides by any of the well known methods. For instance, gamma polyvinyl chloride may be mixed with approximately equal parts of plasticizer such as the dibutyl ester of 4-cyclohexene-1,2-dicarboxylic acid on a heated roll-mill or in an internal mixer, and heated in a mold for 20 min. at 320° F. to produce a transparent, practically colorless composition. When other plasticizers such as tricresyl phosphate, dibutyl phthalate, or dibutyl hexahydro phthalate are employed instead of the dibutyl ester of 4-cyclohexyl-1,2-dicarboxylic acid in the above experiment, dark brown, opaque compositions are produced. When the plasticizers of this invention are employed, the compositions retain their transparency even when heated for an hour at 320° F.

I claim:

1. A composition of matter comprising a polyvinyl halide and a liquid ester of 4-cyclohexene-1,2-dicarboxylic acid.

2. A composition of matter comprising gamma polyvinyl chloride and a liquid ester of 4-cyclohexene-1,2-dicarboxylic acid.

3. A composition of matter consisting essentially of gamma polyvinyl chloride and a liquid dialkyl ester of 4-cyclohexene-1,2-dicarboxylic acid.

4. A composition of matter comprising a polyvinyl halide and the dibutyl ester of 4-cyclohexene-1,2-dicarboxylic acid.

5. A composition of matter consisting essentially of gamma polyvinyl chloride and the dibutyl ester of 4-cyclohexene-1,2-dicarboxylic acid.

6. A composition of matter comprising a polyvinyl halide and the di-2-ethylbutyl ester of 4-cyclohexene-1,2-dicarboxylic acid.

7. A composition of matter consisting essentially of gamma polyvinyl chloride and the di-2-ethylbutyl ester of 4-cyclohexene-1,2-dicarboxylic acid.

8. A composition of matter comprising a polyvinyl halide and the di-2-ethylhexyl ester of 4-cyclohexene-1,2-dicarboxylic acid.

9. A composition of matter consisting essentially of polyvinyl chloride and the di-2-ethylhexyl ester of 4-cyclohexene-1,2-dicarboxylic acid.

THOMAS L. GRESHAM.

CERTIFICATE OF CORRECTION.

Patent No. 2,301,867.   November 10, 1942.

THOMAS L. GRESHAM.

It is hereby certified that error appears in the printed specification of the above numbered patent requiring correction as follows: Second column, line 25, before "I claim:" insert the following paragraphs:

--When compositions having the best attainable dielectric properties are desired, basic stabilizers such as metallic oxides, soaps, lead salts, particularly lead silicate, triethanolamine, etc., may be incorporated in the compositions. The polyvinyl halides may also contain appreciable amounts of other polymers such as polyvinyl organic esters either conjointly polymerized therewith or incorporated therein after polymerization, although compositions in which the polymer consists essentially of a polyvinyl halide, particularly the gamma polymer, are preferred.

While I have herein disclosed specific embodiments of my invention, I do not intend to limit the invention solely thereto, for it is obvious that many modifications including substituting equivalent materials and varying the proportions of materials used are within the spirit and scope of the invention as defined in the appended claims.--;

and that the said Letters Patent should should be read with this correction therein that the same may conform to the record of the case in the Patent Office.

Signed and sealed this 2nd day of February, A. D. 1943.

(Seal)

Henry Van Arsdale,
Acting Commissioner of Patents.